(12) United States Patent
Yoo (10) Patent No.: US 8,308,832 B2
(45) Date of Patent: Nov. 13, 2012

(54) DUST SEPARATING AND COLLECTING APPARATUS OF VACUUM CLEANER

(75) Inventor: Dong-hun Yoo, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 12/698,563

(22) Filed: Feb. 2, 2010

(65) Prior Publication Data

US 2010/0205916 A1  Aug. 19, 2010

Related U.S. Application Data

(60) Provisional application No. 61/152,762, filed on Feb. 16, 2009.

(30) Foreign Application Priority Data

Apr. 23, 2009 (KR) .................. 10-2009-0035459

(51) Int. Cl.
*B01D 45/14* (2006.01)

(52) U.S. Cl. ................. 55/345; 55/348; 55/413; 55/429; 55/DIG. 3

(58) Field of Classification Search ............... 55/DIG. 2, 55/DIG. 3, DIG. 8, 318, 366, 395, 409, 428, 55/429, 345, 346, 348, 349; D32/22, 30–34
See application file for complete search history.

(56) References Cited

U.S. PATENT DOCUMENTS

| | | | |
|---|---|---|---|
| 3,425,192 A * | 2/1969 | Davis | 55/345 |
| 6,607,572 B2 | 8/2003 | Gammack et al. | |
| 6,974,488 B2 | 12/2005 | Dyson | |
| 7,162,770 B2 * | 1/2007 | Davidshofer | 15/353 |
| 7,169,201 B2 * | 1/2007 | Oh et al. | 55/343 |
| 7,335,242 B2 | 2/2008 | Oh | |
| 7,462,212 B2 * | 12/2008 | Han et al. | 55/343 |
| 7,594,944 B2 | 9/2009 | Oh | |
| 7,842,112 B2 * | 11/2010 | Lee et al. | 55/343 |
| 2005/0050865 A1 * | 3/2005 | Oh et al. | 55/345 |
| 2006/0059871 A1 * | 3/2006 | Han et al. | 55/345 |
| 2007/0011999 A1 * | 1/2007 | Oh | 55/345 |
| 2007/0079582 A1 | 4/2007 | Oh | |
| 2007/0095030 A1 | 5/2007 | Oh | |
| 2007/0214754 A1 * | 9/2007 | Kim | 55/345 |

FOREIGN PATENT DOCUMENTS

| | | |
|---|---|---|
| EP | 0018197 A1 | 10/1980 |
| JP | 06-238197 | 8/1994 |
| KR | 10-2003-0062520 | 9/2003 |
| KR | 10-2004-0097265 | 11/2004 |
| KR | 10-2005-0025711 | 3/2005 |
| KR | 1020050119738 A | 12/2005 |
| KR | 10-2006-0058295 | 5/2006 |
| KR | 10-0630949 | 9/2006 |
| KR | 10-0648959 | 11/2006 |
| KR | 10-0648960 | 11/2006 |
| WO | WO 02/067755 A1 | 9/2002 |
| WO | WO 02/067756 A1 | 9/2002 |

* cited by examiner

*Primary Examiner* — Duane Smith
*Assistant Examiner* — Sonji Turner
(74) *Attorney, Agent, or Firm* — NSIP Law (57) ABSTRACT

A dust separating and collecting apparatus is provided. The dust separating and collecting apparatus includes a dust bin housing a centrifugal dust separating portion therein, and an inner cover comprising a passage shifting protrusion extended to an open surface of the centrifugal dust separating portion through which dusts may be discharged, the inner cover covering an open surface of the dust bin.

19 Claims, 6 Drawing Sheets

DUST SEPARATING AND COLLECTING APPARATUS OF VACUUM CLEANER

CROSS-REFERENCE TO RELATED APPLICATION(S)

This application claims the benefit under 35 U.S.C. §119 (e) of U.S. Provisional Application No. 61/152,762, filed on Feb. 16, 2009, in the United States Patent and Trademark Office, and under 35 U.S.C. §119(a) of a Korean Patent Application No. 10-2009-0035459, filed on Apr. 23, 2009, in the Korean Intellectual Property Office, the entire disclosures of which are incorporated herein by reference for all purposes.

BACKGROUND

1. Field

The following description relates to a vacuum cleaner, and more particularly, to a dust separating and collecting apparatus adapted for use in a vacuum cleaner.

2. Description of the Related Art

Centrifugal type vacuum cleaners rotate an air stream and remove dusts therefrom using a centrifugal force of the rotating air stream, and have been used to address the problems arising from use of dust bags.

A general centrifugal type vacuum cleaner may include a dust separating and collecting apparatus. The dust separating and collecting apparatus may include a centrifugal separating portion having a cyclone to rotate an air stream and remove dusts from the rotating air stream, and a dust collecting portion to collect the dusts removed at the centrifugal separating portion.

Especially, in a reverse dust collecting apparatus, an air is entered through the lower part of the centrifugal separating portion, rotates, moves upwardly and flows in the reverse direction in the centrifugal separating portion. A dust in the air is discharged through an upper opening of the centrifugal separating portion.

Various suggestions have been made to satisfy the abovementioned demands, including dust separating and collecting apparatuses disclosed in Korean Registered Patent No. 10-648960, Korean Patent Publication No. 10-2005-119738, WIPO Publication No. WO 02/067756, European Patent No. EP 18197, Japanese Patent Publication No. 6-238197.

However, in the abovementioned conventional arts, the air could not turn in the reverse direction smoothly so that the air passage may be unstable, and a pressure loss may increase or a dust separating efficiency may decrease.

SUMMARY

In one general aspect, there is provided a dust separating and collecting apparatus of a vacuum cleaner, including a dust bin housing a centrifugal dust separating portion therein, and an inner cover comprising passage shifting protrusions extended to an open surface of the centrifugal dust separating portion through which dusts are discharged, the inner cover covering an open surface of the dust bin.

The passage shifting protrusions may further include supplementary passage shifting protrusions extended from a surface which faces the centrifugal dust separating portion.

The supplementary passage shifting protrusions may be formed so as to be inserted into the centrifugal dust separating portion.

The centrifugal dust separating portion may include a first dust separating portion and a second dust separating portion having one or more second cyclones. The passage shifting protrusions may be extended from a surface of the inner cover which faces open surfaces of the second cyclones through which dusts of the second cyclones are discharged.

The passage shifting protrusions may further include supplementary passage shifting protrusions extended so as to be inserted into the second cyclones.

The supplementary passage shifting protrusions may each include a section gradually-narrowed to the inner side of the cyclone, and thus have an inclined side.

The dust separating and collecting apparatus may further include a discharging portion to collect and discharge air streams which are discharged from the second cyclones.

The discharging portion may include a discharge air collecting portion to collect air streams discharged from the second cyclones, a discharge portion outlet pipe to discharge air streams collected at the discharge air collecting portion, and a partitioning wall to separate a lower area of the dust bin into a first dust collecting portion and a second dust collecting portion.

The discharge air collecting portion may include complimentary-shaped portions corresponding to an outer circumference of a lower surface of each of the second cyclones.

Spaces between the complimentary-shaped portions may form a passage for dusts to flow to the second dust collecting portion.

The discharge air collecting portion may further include a discharge guiding portion to guide a discharged air stream from each of the complimentary-shaped portions to an upper portion of the discharge portion outlet pipe.

The partitioning wall may have a sunken wall protruding to the second dust collecting portion, the sunken wall formed on a surface which faces the discharge portion outlet pipe.

The second dust separating portion may further include second supplementary cyclones, and the complimentary-shaped portions may further include complimentary-fitting portions mated with lower surfaces of the second supplementary cyclones.

The inner cover may include a dome portion formed on a surface which faces an open surface of the first dust separating portion through which dusts of the first dust separating portion are discharged.

In another aspect, there is provided a dust separating and collecting apparatus including a dust bin having a centrifugal dust separating portion and an air stream inlet through which an air stream enters the centrifugal dust separating portion, an inner cover positioned at one end of the of the dust bin and covering an end of the dust bin and the centrifugal dust separating portion, and an outlet pipe positioned at an opposite end of the centrifugal dust separating portion from the inner cover.

The dust separating and collecting apparatus may be configured to be removably attached to a vacuum cleaner.

The centrifugal dust separating portion may include a first dust separating portion, the outlet pipe positioned in the first dust separating portion. The air stream enters the first dust separating portion via the air stream inlet, reverses direction upon reaching the inner cover, and exits the first dust separating portion through the outlet pipe.

The centrifugal dust separating portion may further include a second dust separating portion having a second outlet pipe positioned at one end. The inner cover may further include at least one passage shifting protrusion protruding into the second dust separating portion at an end opposite from the second outlet pipe. The air stream enters the second dust separating portion from the outlet pipe, reverses direction upon reaching the at least one passage shifting protrusion, and exits the second dust separating portion through the second outlet pipe.

Dust may be separated from the air stream in the first dust separating portion and discharged through a space between the inner cover and the first dust separating portion into a first dust collecting portion. Dust may be further separated from the air stream in the second dust separating portion and discharged into a second dust collecting portion.

The supplementary passage shifting protrusions may each include a section that is gradually narrowed toward the inner side of the centrifugal dust separating portion, and thus includes an inclined side.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, description of well-known functions and constructions may be omitted for increased clarity and conciseness.

As shown in FIGS. 1 to 6, for example, the dust separating and collecting apparatus 100 includes an upper cover 10, an inner cover 20, a dust bin 30, a centrifugal separating portion 40, a discharging portion 50, and a lower cover 60.

The upper cover 10 includes a handle 11 which has an upper cover hook 13 to fix the dust separating and collecting apparatus 100 to a vacuum cleaner (not illustrated) in a locked state, and an unhook button 12 to release the upper cover hook 13 from the locked state.

Figure 3:
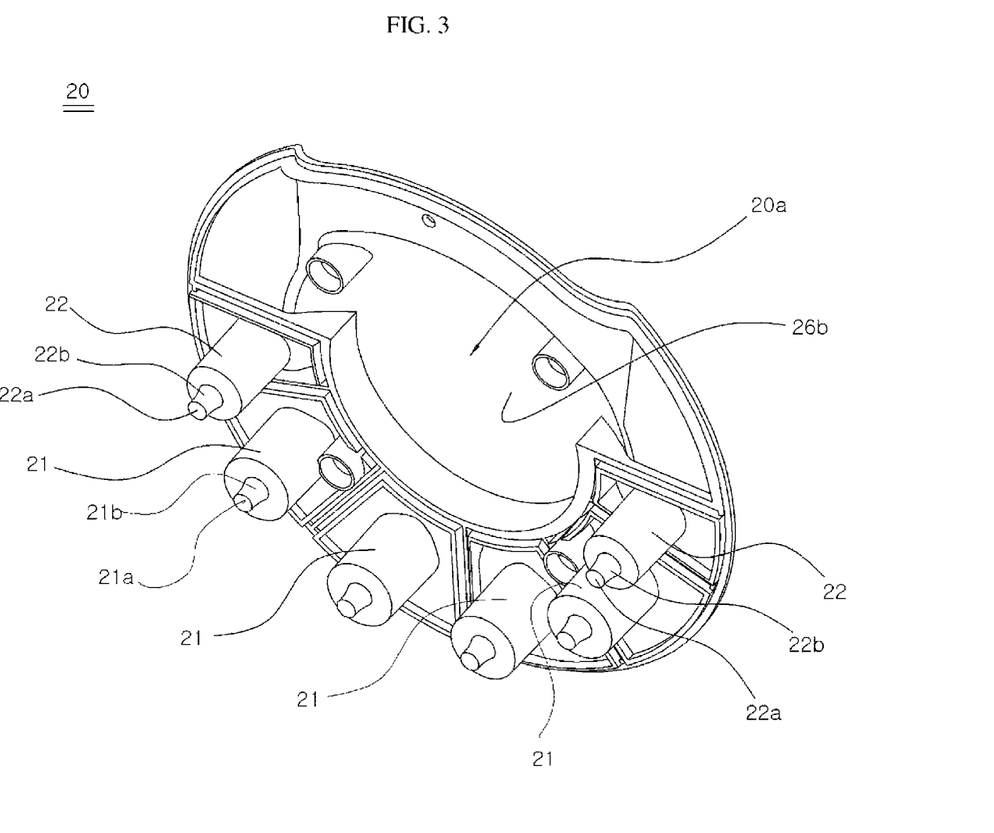
FIG. 3 is a diagram illustrating a bottom perspective view showing an example of an inner cover 20 of FIG. 1.

In the example shown in FIG. 3, the inner cover 20 includes a dome portion 20a which may be formed at a center area, or other suitable area, which faces the upper portion of a first separating portion 43. The inner cover 20 also includes a first passage shifting protrusion 21 and a second passage shifting protrusion 22.

The outer circumference of the dome portion 20a has a longer diameter than the outer circumference of the first separating portion 43, and also includes an upwardly-recessed portion. The dome portion 20a may reverse a direction of the air stream which is upwardly-spinning within the first separating portion 43, and the recessed portion of the dome portion 20a may guide the dusts removed from the air stream so that the dusts are discharged into a first collecting portion 32.

The first and second passage shifting protrusions 21, 22 are extended from a surface of the inner cover 20 to face dust discharging open portions of a second cyclone 47a and a second supplementary cyclone 47b. The example shown in FIG. 3 illustrates three first passage shifting protrusions 21 and two second passage shifting protrusion 22. However, the number of first and second passage shifting protrusions is not limited to this example, as any suitable number may be used.

The first and second passage shifting protrusions 21, 22 each include a first supplementary passage shifting protrusions 21a and a second supplementary passage shifting protrusion 22a which are extended downwardly from a lower surface and inserted into the inner portion of the second cyclone 47a or the second supplementary cyclone 47b.

The first and second supplementary passage shifting passages 21a, 22a have gradually-narrowed sections in a downward direction, and thus have a first inclined surface 21b and a second inclined surface 22b, respectively, each having an outer side formed at a predetermined inclination. The first and second inclined surfaces 21b, 22b may include curved, inclined surfaces for a smooth reversing of the direction of the air stream and an efficient dust discharge.

The lower surfaces of the first and second passage shifting protrusions 21, 22 help an upwardly-rotating air stream along the inner sides of the second cyclone 47a and the second supplementary cyclone 47b to keep rotating efficiently even around the open portions where the dusts are discharged, and also cause the air stream to reverse a direction to thus face a second outlet pipe 48. The surfaces of the first and second passage shifting protrusions 21, 22 facing the second cyclone 47a and the second supplementary cyclone 47b may block an air stream from flowing into a second collecting portion 33 so as to limit agitation of dusts collected in the second collecting portion 33.

In the above process, the first and second supplementary passage shifting protrusions 21a, 22a may cause the reversed air stream to flow smoothly along the outer sides of the inclined surfaces 21b, 22b so as to reduce pressure loss of the reversed air stream and to increase dust removal efficiency.

Additionally, although not illustrated, the inner cover 20 may further include another passage shifting protrusion extended from a lower surface of the dome portion 20a toward the first separating portion 43, and another supplementary passage shifting protrusion extended from a surface facing the first separating portion 43 to be inserted into the first separating portion 43, to increase dust efficiency within the first separating portion 43.

Figure 1:
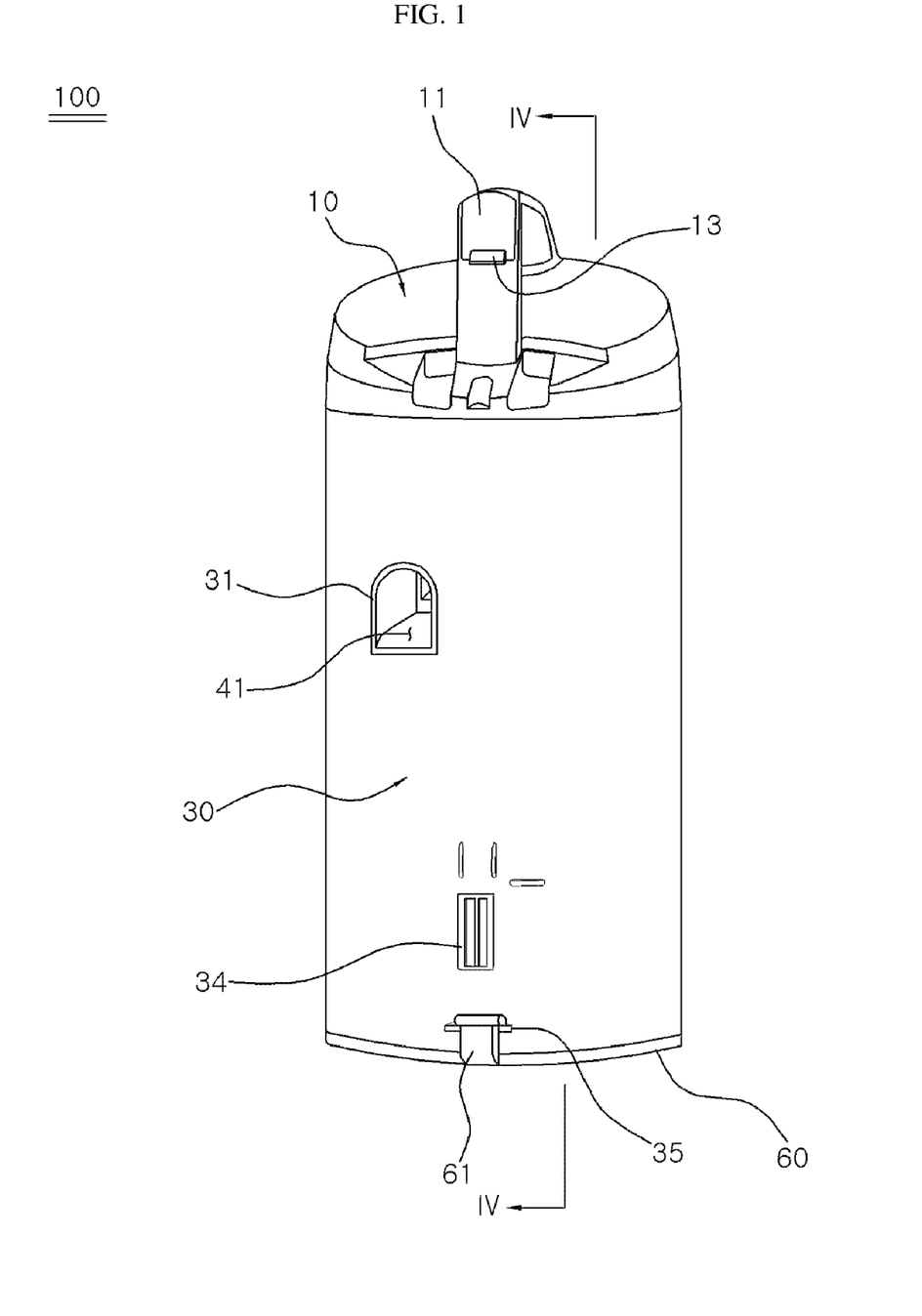
FIG. 1 is a diagram illustrating a perspective view showing an example of a dust separating and collecting apparatus 100.
Figure 2:
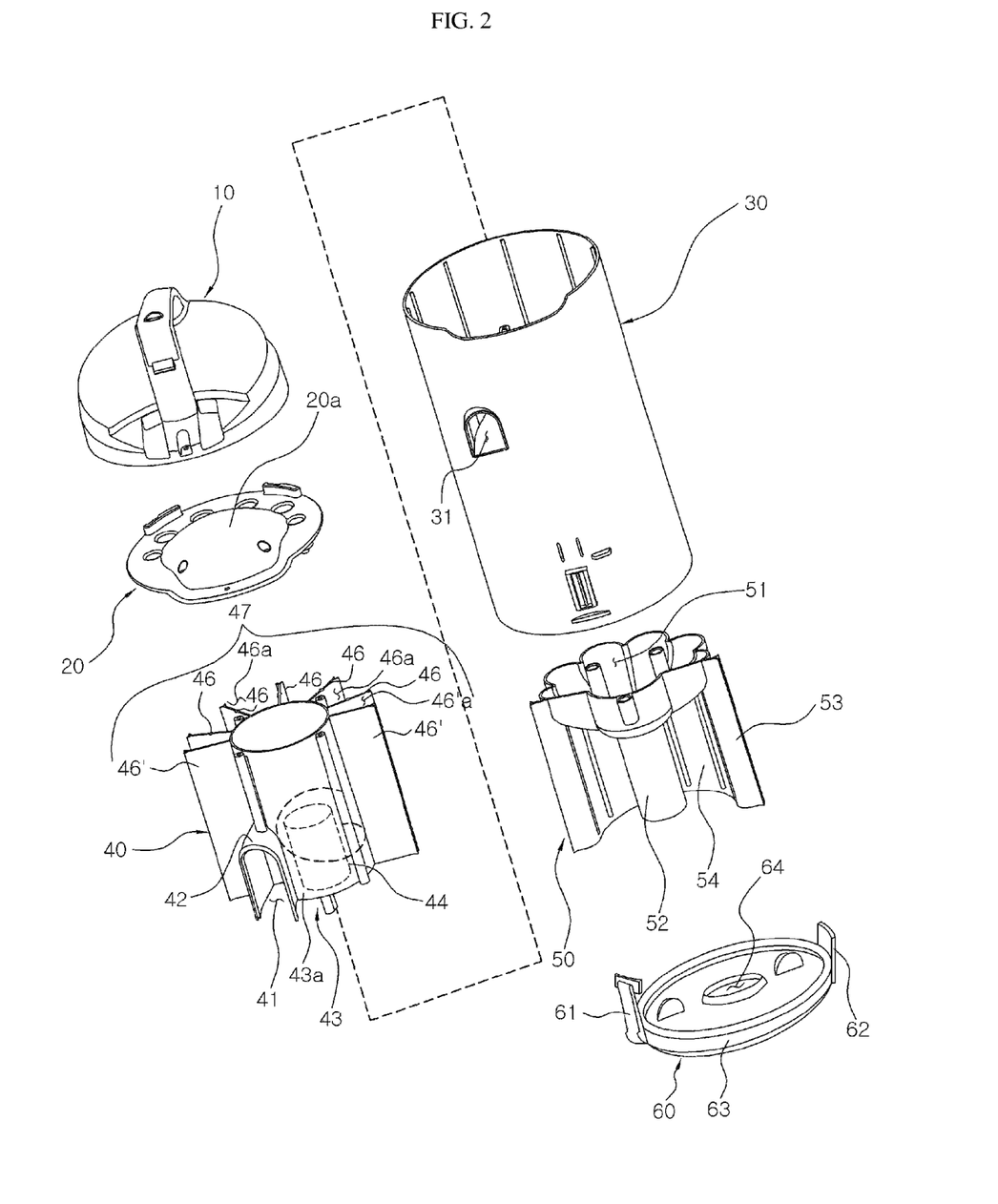
FIG. 2 is a diagram illustrating an exploded perspective view showing an example of the dust separating and collecting apparatus 100 of FIG. 1.

In the examples illustrated in FIGS. 1 and 2, the dust bin 30 includes a dust bin inlet 31 formed in a side thereof, an open/close button 34 to open and close a lower cover 60, and a fixing protrusion 35 to be engaged with the lower cover hook 61. The dust bin 30 has a cylindrical structure with open upper and lower portions.

Figure 6:
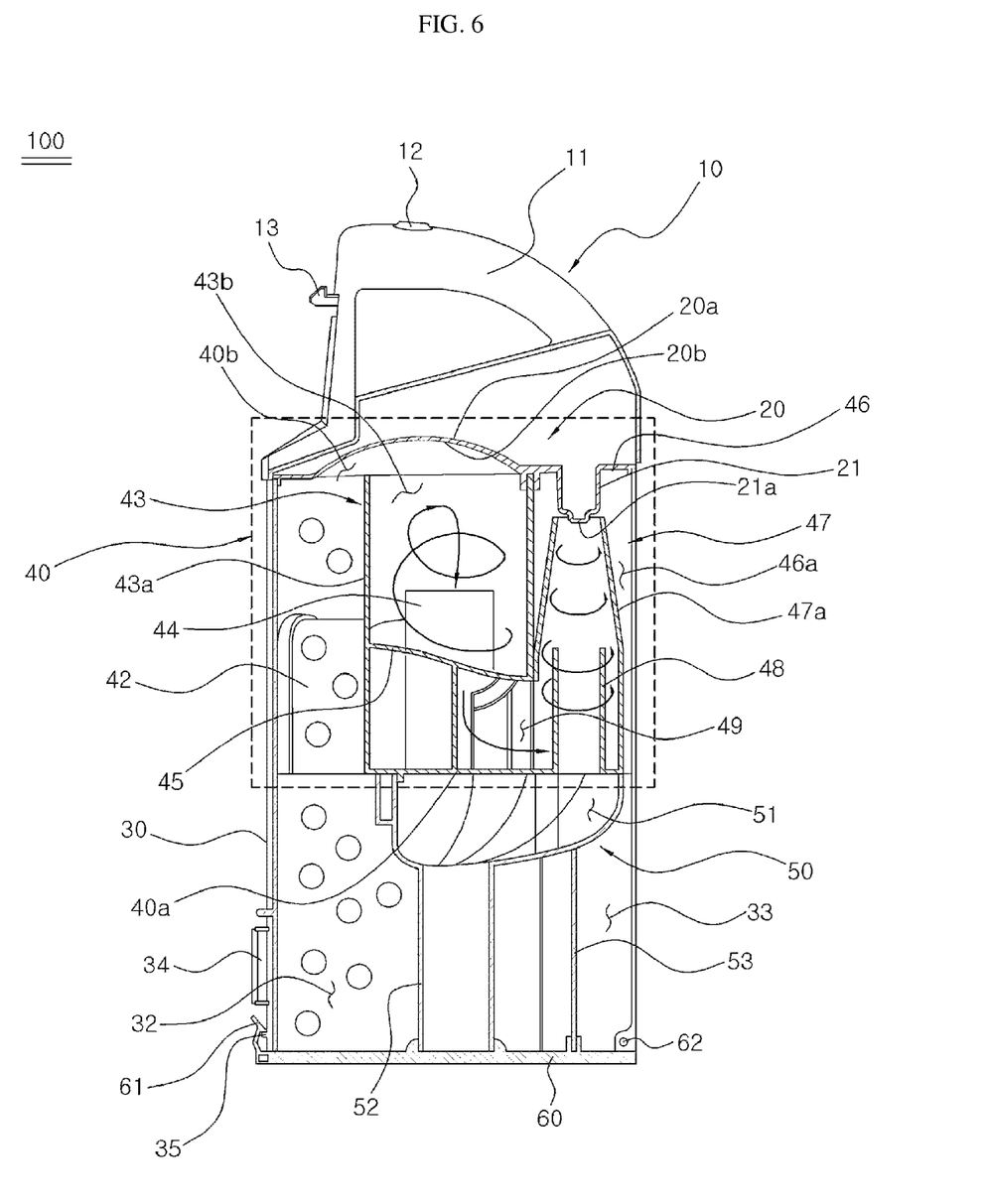
FIG. 6 is a diagram illustrating a cross section view showing an example of the dust separating and collecting apparatus of FIG. 1.

As shown in FIG. 6, for example, the dust bin 30 with the structure explained above has the first dust collecting portion 32 and the second dust collecting portion 33 which are divided by the centrifugal separating portion 40 and the discharging portion 50 housed therein. The first dust collecting portion 32 collects dusts removed in the first separating portion 43, and the second dust collecting portion 33 collects dusts removed in the second separating portion 47.

Figure 4:
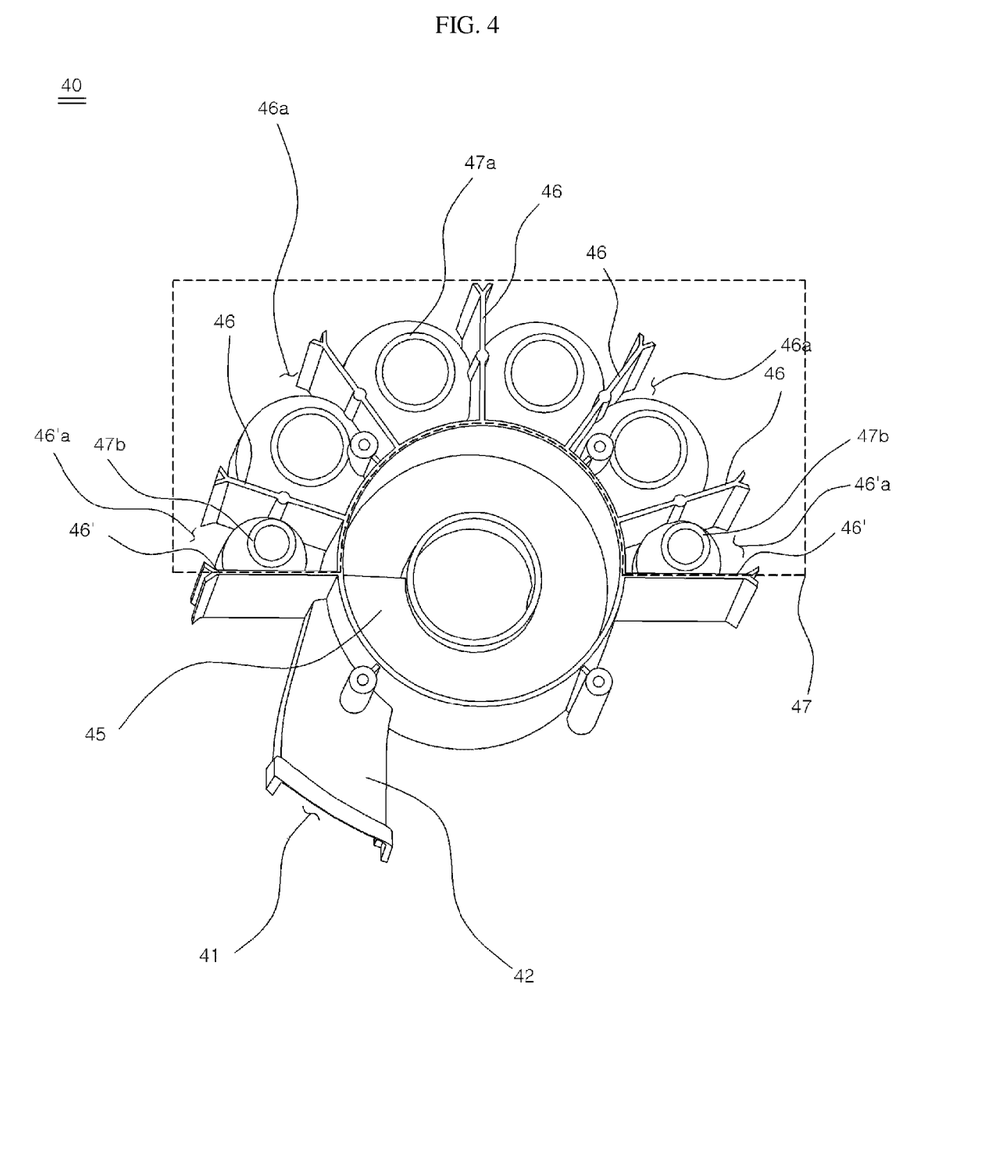
FIG. 4 is a diagram illustrating a perspective view showing an example of a centrifugal separating portion of FIG. 1.

Referring to FIGS. 4 and 6, for example, the centrifugal separating portion 40 includes the first separating portion 43 and the second separating portion 47. The first separating portion 43 is configured to separate relatively heavier and larger dust particles from an externally-drawn air stream, and the second separating portion 47 is configured to separate minute dust particles from an air stream received from the first separating portion 43.

The first separating portion 43 includes a first inlet pipe 41 to receive an external air stream, and a first dust separating area 43b defined by a first partitioning wall 43a.

A first outlet pipe 44 is positioned in the first dust separating area 43b to discharge the received external air stream after dust has been removed from the air stream. The first outlet pipe 44 has an open portion of the lower outer surface which faces the second separating portion 47. The open portion of the lower surface of the first outlet pipe 44 is fluidly connected to the open lower surfaces of the cyclones 47a, 47b, and thereby forms a connecting portion 49 through which an air stream discharged through the first outlet pipe 44 is introduced into the second separating portion 47.

A spirally-formed first passage guide 45 is formed on an outer side of the first outlet pipe 44 to guide an air stream to move upwardly in a spinning motion.

The second separating portion includes second dust separating areas 46a and second supplementary dust separating areas 46'a. The second dust separating areas 46a may be formed by a plurality of second partitioning walls 46 extending from a predetermined portion of the outer surface of the first partitioning wall 43a into an inner side of the dust bin 30 at predetermined intervals. The second supplementary dust separating areas 46'a may be formed by second supplementary partitioning walls 46'. The second cyclones 47a and the second supplementary cyclones 47b are arranged within the second dust separating areas 46a and the second supplementary dust separating areas 46'a, each having a conical upper portion, a cylindrical lower portion, and an open surface formed on the cylindrical lower portion and connected fluidly to the connecting portion 49. The second outlet pipes 48 are placed within the second cyclones 47a and the second supplementary cyclones 47b.

At least one of the second supplementary dust separating areas 46'a is positioned in the second separating portion and includes a smaller-diameter cyclone and outlet pipe, relative to the second dust separating areas 46a. The second supplementary dust separating areas may be formed on both sides of the second dust separating area 46a, to enhance efficiency of fine dust removal.

Accordingly, the centrifugal separating portion 40 is formed in a manner in which only the lower surface of the second outlet pipe 48 is open, while other areas, including the lower portions of the first and second dust separating portions 43, 47, are blocked by a plate 40a. The plate 40 may be shaped according to the shape of a corresponding area. The plates 40a covering the lower surface of the centrifugal separating portion 40 may be formed integrally with the centrifugal separating portion 40, or with the dust bin 30.

Figure 5:
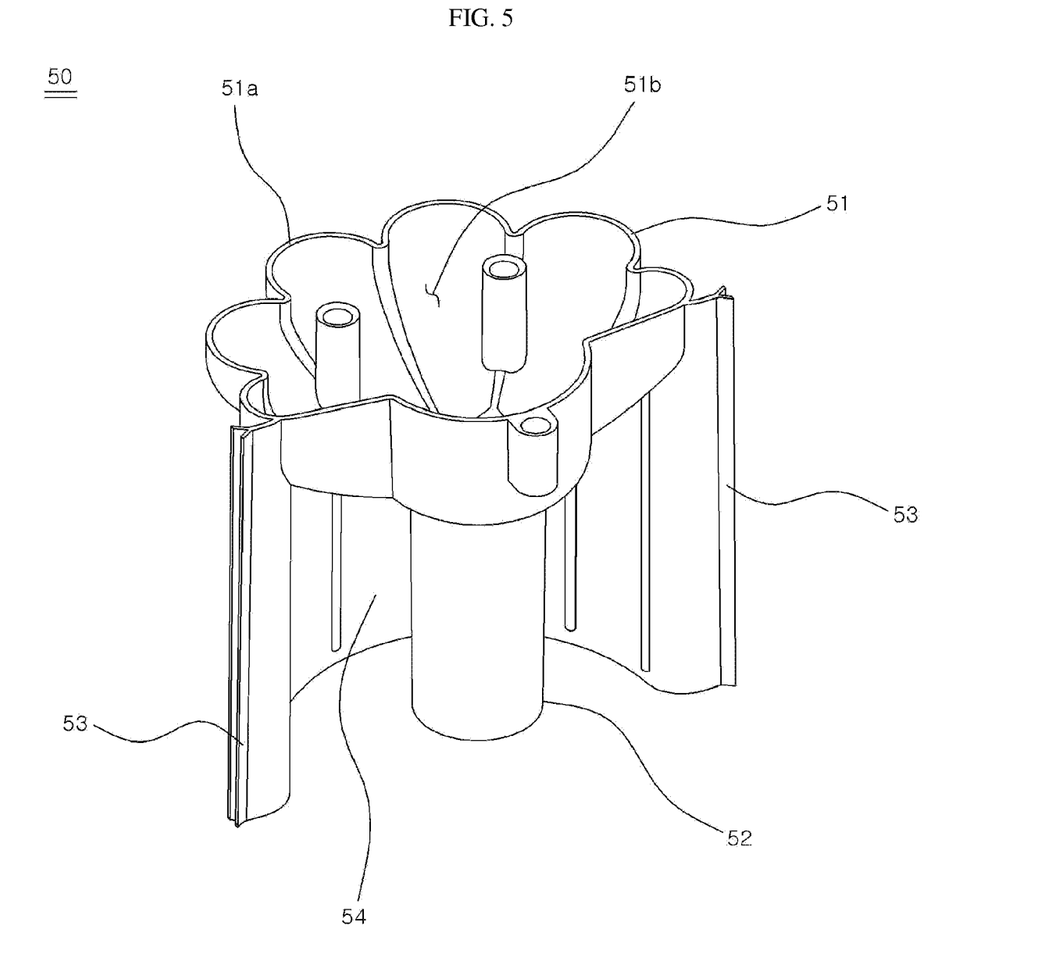
FIG. 5 is a diagram illustrating a perspective view showing an example of a discharging portion of FIG. 1.

Referring to FIGS. 5 and 6, for example, the discharging portion 50 includes a discharge air collecting portion 51, a discharge portion outlet pipe 52, and a partitioning wall 53 having and a sunken wall 54.

The discharge air collecting portion 51 may be shaped like an open folding fan, and include a plurality of complementary-shaped portions 51a, and sunken discharge guiding portions 51b.

The complementary-shaped portions 51a may include arc-shaped portions having sides connected to each other to be fit in the lower outer circumferences of the second cyclones 47a and the second supplementary cyclones 47b of the second dust separating portion 47. When fit in place, the complementary-shaped portions 51a separate an area defined by the lower open surfaces of the second cyclones 47a and second supplementary cyclones 47b, and the upper surface of the discharging portion 50, from the second dust collecting portion 33. Spaces formed between arcuate portions on an outer surface of the complementary-shaped portions 51a form passages through which dusts may be moved to the second dust collecting portion 33.

The sunken discharge guiding portions 51b are formed in numbers corresponding to the number of the complementary-shaped portions 51a, and include valleys extended between the complementary-shaped portions 51a and the outlet pipe, and ridges formed by the sides thereof connected to each other. Ends of the valleys and ridges are converged at an upper portion of the discharge portion outlet pipe 52. Accordingly, the discharge guiding portion 51b may converge an air stream discharged from the second cyclones 47a and the second supplementary cyclones 47b to the discharge portion outlet pipe 52 at the center.

Since the discharge air collecting portion 51 with the above-explained structure is located on the lower surfaces of the second cyclones 47a and the second supplementary cyclones 47b to converge air streams discharged out of the second outlet pipes 48 to the discharge portion outlet pipe 52, discharge efficiency may be increased.

The discharge portion outlet pipe 52 may have a cylindrical shape with open upper and lower surfaces, and may be formed integrally with the discharge air collecting portion 51 in a manner in which the ends of the discharge guiding portions 51b formed on the discharge air collecting portion 51 are placed above the open upper portion of the discharge portion outlet pipe 52.

The partitioning wall 53 includes the sunken wall 54 which is formed on a middle portion of the partitioning wall and which surrounds at least a portion of the discharge portion outlet pipe 52. Both sides of the partitioning wall 53 extend outward toward an inner side wall of the dust bin 30 to divide the lower portion of the dust bin 30 into the first and second dust collecting portions 32, 33. The sunken wall 54 protrudes toward the second dust collecting portion 33. As a result, the first dust collecting portion 32, which collects relatively heavier and larger dust particles, has a larger area than the second dust collecting portion 33, and the dust bin 30 may have an improved dust removal efficiency. The sunken wall 54 may have an arc-shaped wall to surround the discharge portion outlet pipe 52.

Referring further reference to FIG. 2, for example, the lower cover 60 includes a passing hole 64 formed on a middle portion thereof in fluid connection with the discharge portion outlet pipe 52. The lower cover hook 61 is provided on a side of the lower cover 60 and a sealing member 63 may be formed along an edge of the lower cover 60, so that the lower cover 60 may be removably connected to the lower surface of the dust bin 30 by a hinge 62 and the lower cover hook 61.

An example of the operation of the dust separating and collecting apparatus 100 is explained below, with reference mainly to the example depicted in FIG. 6.

The centrifugal separating portion 40 and the discharging portion 50 are inserted into the dust bin 30 and secured in place. The inner cover 20 is connected to the dust bin 30 in a manner in which the inner cover 20 covers the upper open portion of the dust bin 30. The lower surface of the inner cover 20 is at a predetermined distance from the upper end of the first and second dust separating portions 43, 47. The upper cover 10 is connected to the dust bin 30 at the upper portion of the inner cover 20.

Accordingly, as the vacuum cleaner (not illustrated) with the dust separating and collecting apparatus 100 mounted therein is operated, a fan motor (not illustrated) is driven, and the centrifugal separating portion 40 draws an external air stream into the first dust separating area 43b through the first inlet 41 connected to the dust bin inlet 31. The drawn air stream is rotated about the first outlet pipe 44 due to the first passage guide 45, while moving to the upper portion of the first dust separating area 43b.

While the air stream is rotated and moved to the upper portion of the first dust separating area 43b, relatively heavier and larger dust particles are separated from the rotating air stream due to centrifugal force, and discharged into the first dust collecting portion 32 through a space 40b between the inner cover 20 and the first dust separating portion 43.

After the dust particles are removed, the air stream rotating in the first dust separating area 43b to the upper portion is reversed to face the opposite direction due to the suction force of the first outlet pipe 44.

By reversing the direction of the air stream rotating in the first dust separating area 43b in a manner explained above, dust may be removed more rapidly with increased dust removal efficiency.

A sunken surface 20b formed on a lower surface of the dome portion 20a further increases discharge and dust removal efficiency, by reflecting the rotating air stream and thus facilitating the reverse of the air stream, and guiding the removed dust particles to be discharged into the first dust collecting portion 32 through the space 40b.

After the relatively heavier or larger dust particles are removed, and a direction of the air stream is reversed, the air stream exits the first dust separating portion 43 and is introduced into the second dust separating portion 47. The air stream is introduced into the second dust separating portion 47 through the first outlet pipe 44 and the connecting portion 49 due to the suction force of the fan motor (not illustrated) of the vacuum cleaner.

The air stream in the second dust separating portion 47 is introduced into the second cyclones 47a and the second supplementary cyclones 47b which are formed in the second dust separating areas 46a and the second supplementary dust separating areas 46'a, respectively, of the second dust separating portion 47.

The air stream within the second cyclones 47a and the second supplementary cyclones 47b is rotated upwardly along the inner surfaces of the second cyclones 47a or the second supplementary cyclones 47b.

The air stream reaching the upper portion of the second cyclones 47a and the second supplementary cyclones 47b is reflected against the lower surfaces of the first and second passage shifting protrusions 21, 22, thereby reversing the direction of the airstream. Since the first and second inclined surfaces 21b, 22b guide the returning air stream to flow in a smooth curve pattern, the abrupt reversing of the direction and subsequent loss of pressure may be prevented. Therefore, dusts may be removed and discharged efficiently.

After being reversed inside the second cyclones 47a and the second supplementary cyclones 47b of the second dust separating portion 47, the air stream is discharged to the discharging portion 50 through the second outlet pipes 48 formed within the second cyclones 47a and the second supplementary cyclones 47b.

The discharging portion 50 causes the air streams discharged from the second outlet pipes 48 of the second dust separating portion 47 to meet at the upper portion of the discharge portion outlet pipe 52, so that the air stream can be discharged out of the dust separating and collecting apparatus 100 through the discharge portion outlet pipe 52 and the passing holes formed in and the lower cover 60.

As explained above, the curved inclined surfaces connected to the passage shifting protrusions and the supplementary passage shifting protrusions may facilitate the rotation of the air stream and increase dust removal efficiency within the centrifugal separating portion.

Furthermore, due to stabilized air flow and efficient reversing of air stream, pressure loss may be reduced.

Further still, since the curved inclined surfaces of the passage shifting protrusions and the supplementary passage shifting protrusions guide the removed dusts to be discharged out, dusts may be discharged from the centrifugal separating portion efficiently.

A number of examples of embodiments have been described above. Nevertheless, it will be understood that various modifications may be made. For example, suitable results may be achieved if the described techniques are performed in a different order and/or if components in a described system, architecture, circuit, device, or apparatus are combined in a different manner and/or replaced or supplemented by other components or their equivalents. Accordingly, other implementations are within the scope of the following claims.

What is claimed is:

1. A dust separating and collecting apparatus of a vacuum cleaner, the dust separating and collecting apparatus comprising:
   a dust bin housing a centrifugal dust separating portion therein; and
   an inner cover comprising a plurality of passage shifting protrusions extended from a surface of the inner cover to an open surface of the centrifugal dust separating portion through which dusts are discharged, the inner cover covering an open surface of the dust bin.

2. The dust separating and collecting apparatus of claim 1, wherein the passage shifting protrusions further comprise supplementary passage shifting protrusions extended from a surface which faces the centrifugal dust separating portion.

3. The dust separating and collecting apparatus of claim 2, wherein the supplementary passage shifting protrusions are inserted into the centrifugal dust separating portion.

4. The dust separating and collecting apparatus of claim 3, wherein the supplementary passage shifting protrusions each has a section gradually-narrowed toward the inner side of the centrifugal dust separating portion, and thus has an inclined side.

5. A dust separating and collecting apparatus of a vacuum cleaner, the dust separating and collecting apparatus comprising:
   a dust bin housing a centrifugal dust separating portion therein; and
   an inner cover comprising passage shifting protrusions extended to an open surface of the centrifugal dust separating portion through which dusts are discharged, the inner cover covering an open surface of the dust bin,
   wherein the centrifugal dust separating portion comprises a first dust separating portion and a second dust separating portion having one or more second cyclones, the second cyclones having open surfaces, and
   the passage shifting protrusions are extended from a surface of the inner cover which faces the open surfaces of the second cyclones through which dusts of the second cyclones are discharged.

6. The dust separating and collecting apparatus of claim 5, wherein the passage shifting protrusions further comprise supplementary passage shifting protrusions extended so as to be inserted into the second cyclones.

7. The dust separating and collecting apparatus of claim 6, wherein the supplementary passage shifting protrusions each has a section gradually-narrowed to the inner side of the cyclone, and thus has an inclined side.

8. The dust separating and collecting apparatus of claim 5, further comprising a discharging portion to collect and discharge air streams which are discharged from the second cyclones.

9. The dust separating and collecting apparatus of claim 8, wherein the discharging portion comprises:
 a discharge air collecting portion to collect air streams discharged from the second cyclones;
 a discharge portion outlet pipe to discharge air streams collected at the discharge air collecting portion; and
 a partitioning wall to separate a lower area of the dust bin into a first dust collecting portion and a second dust collecting portion.

10. The dust separating and collecting apparatus of claim 9, wherein the discharge air collecting portion comprises complimentary-shaped portions corresponding to an outer circumference of a lower surface of each of the second cyclones.

11. The dust separating and collecting apparatus of claim 10, wherein spaces between the complimentary-shaped portions form a passage for dusts to flow to the second dust collecting portion.

12. The dust separating and collecting apparatus of claim 10, wherein the discharge air collecting portion further comprises a discharge guiding portion to guide a discharged air stream from each of the complimentary-shaped portions to an upper portion of the discharge portion outlet pipe.

13. The dust separating and collecting apparatus of claim 9, wherein the partitioning wall has a sunken wall protruding to the second dust collecting portion, the sunken wall formed on a surface which faces the discharge portion outlet pipe.

14. The dust separating and collecting apparatus of claim 10, wherein the second dust separating portion further comprises second supplementary cyclones, and
 the complimentary-shaped portions further comprise complimentary-fitting portions mated with lower surfaces of the second supplementary cyclones.

15. The dust separating and collecting apparatus of claim 5, wherein the inner cover comprises a dome portion formed on a surface which faces an open surface of the first dust separating portion through which dusts of the first dust separating portion are discharged.

16. A dust separating and collecting apparatus comprising:
 a dust bin having a centrifugal dust separating portion and an air stream inlet through which an air stream enters the centrifugal dust separating portion;
 an inner cover positioned at one end of the dust bin and covering an end of the dust bin and the centrifugal dust separating portion, the inner cover comprising a plurality of passage shifting protrusions extended from a surface of the inner cover to an open surface of the centrifugal dust separating portion through which dusts are discharged; and
 an outlet pipe positioned at an opposite end of the centrifugal dust separating portion from the inner cover.

17. The dust separating and collecting apparatus of claim 16, wherein:
 the centrifugal dust separating portion includes a first dust separating portion;
 the outlet pipe is positioned in the first dust separating portion; and
 the air stream enters the first dust separating portion via the air stream inlet, reverses direction upon reaching the inner cover, and exits the first dust separating portion through the outlet pipe.

18. The dust separating and collecting apparatus of claim 17, wherein the centrifugal dust separating portion further comprises a second dust separating portion having a second outlet pipe positioned at one end;
 the inner cover further includes at least one passage shifting protrusion protruding into the second dust separating portion at an end opposite from the second outlet pipe;
 wherein the air stream enters the second dust separating portion from the outlet pipe, reverses direction upon reaching the at least one passage shifting protrusion, and exits the second dust separating portion through the second outlet pipe.

19. The dust separating and collecting apparatus of claim 18, wherein dust is separated from the air stream in the first dust separating portion and discharged through a space between the inner cover and the first dust separating portion into a first dust collecting portion, and dust is further separated from the air stream in the second dust separating portion and discharged into a second dust collecting portion.

* * * * *